(12) United States Patent
Griffith

(10) Patent No.: US 9,164,739 B2
(45) Date of Patent: Oct. 20, 2015

(54) SYSTEMS AND METHODS FOR GENERATING A STANDARDIZED POWER GENERATION CLASS MODEL

(75) Inventor: Katrina Marie Griffith, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/460,067

(22) Filed: Apr. 30, 2012

(65) Prior Publication Data

US 2013/0290923 A1 Oct. 31, 2013

(51) Int. Cl.
*G06F 9/44* (2006.01)

(52) U.S. Cl.
CPC ........................ *G06F 8/35* (2013.01)

(58) Field of Classification Search
None
See application file for complete search history.

(56) References Cited

U.S. PATENT DOCUMENTS

| | | | |
|---|---|---|---|
| 7,698,684 B2* | 4/2010 | Baikov | 717/118 |
| 7,779,050 B2* | 8/2010 | Adamson et al. | 707/809 |
| 2004/0123600 A1* | 7/2004 | Brunell et al. | 60/773 |
| 2007/0198461 A1* | 8/2007 | Glomann | 707/1 |
| 2009/0077511 A1* | 3/2009 | Wahler et al. | 716/5 |
| 2010/0031374 A1* | 2/2010 | Jung et al. | 726/30 |
| 2010/0082689 A1* | 4/2010 | Wargin et al. | 707/791 |
| 2010/0262265 A1* | 10/2010 | Karaffa | 700/87 |
| 2011/0257956 A1* | 10/2011 | Goel et al. | 703/18 |
| 2012/0096426 A1* | 4/2012 | Sarafudinov | 717/104 |
| 2012/0110545 A1* | 5/2012 | Jerman et al. | 717/104 |
| 2012/0198416 A1* | 8/2012 | Sirr et al. | 717/104 |

OTHER PUBLICATIONS

European Search Report for Application No. 13165706.6-1954 dated Feb. 27, 2014.
Dzafic et al. "Power System Model Driven Architecture." IEEE MELECON 2004. Dubrovnik, Croatia, May 12-15, 2004. pp. 823-826.
Izudin Dzafic. "An Object-Oriented Graphical Framework for Power System Analysis." POWERENG 2004. Setubal, Portugal, Apr. 12-14, 2007. pp. 255-264.
Wang et al. "Object-Oriented Analysis and Design of Transient Stability Simulation for Distributed Power Generation System." Sustainable Power Generation and Supply, 2009. Supergen '09. International Conference ON, IEEE, Piscataway, NJ, Apr. 6, 2009. pp. 1-8 XP031640069 (ISBN: 978-1-4244-4934-7).

* cited by examiner

*Primary Examiner* — Don Wong
*Assistant Examiner* — Roberto E Luna
(74) *Attorney, Agent, or Firm* — Sutherland Asbill & Brennan LLP

(57) ABSTRACT

Certain embodiments herein relate to generating a power generation class model for use by program code to interact with one or more operational components in a power generation system. The class model may include objects and elements which may be associated with operational components and attributes associated with the operational components, respectively. Associations may be made between such operational components and their attributes. Various representations of the class model, based at least in part on the associations, may be output for use by program code. In one embodiment, a class model may be generated using Uniform Modeling Language (UML). The UML class may be converted to a schema, such as Extensible Markup Language Schema Definition (XSD), and compiled to create a Java or C# object, in one embodiment.

15 Claims, 3 Drawing Sheets

SYSTEMS AND METHODS FOR GENERATING A STANDARDIZED POWER GENERATION CLASS MODEL

TECHNICAL FIELD

Embodiments herein relate generally to object-oriented computer programming and, more particularly, to creating a standardized object-oriented class for interacting with equipment in a power generation system.

BACKGROUND OF THE INVENTION

Software application developers may develop various software applications to interact with power generation equipment, such as turbines and compressors. To interact with such equipment, software developers may include references to the equipment in software applications. Such references, however, may not be used consistently across power generation plants, thereby requiring software developers to develop a separate software application for each power plant. Additionally, references to power generation equipment may not be meaningful to various persons who may require interaction with the equipment. Therefore, additional time and expense may be required to translate references or terminology associated with the equipment before tasks may be completed. The inability to reuse software applications due to inconsistent use of references across power generation plants may add to this expense and introduce inefficiencies in software development processes.

BRIEF DESCRIPTION OF THE INVENTION

Some or all of the above needs and/or problems may be addressed by certain embodiments of the invention. Certain embodiments may include systems and methods for generating a power generation class model for use by program code to interact with operational components in a power generation system. According to one embodiment, there is disclosed a method for generating, by a computing system comprising one or more computers, one or more objects in a power generation class model, wherein the one or more objects are associated with one or more respective operational components in a power generation system. The method also includes associating, by the computing system, at least one object with at least one other object of the one or more objects, wherein the association is based at least in part on a relationship between respective operational components. The method further includes outputting, by the computing system, a representation of the power generation class model based at least in part on the association.

According to another embodiment, there is disclosed one or more computer-readable media storing computer-executable instructions that, when executed by at least one processor, configure the at least one processor to perform certain operations. The performed operations may include generating one or more objects in a power generation class model, wherein the one or more objects are associated with one or more respective operational components in a power generation system. The performed operations may also include associating at least one object with at least one other object of the one or more objects, wherein the association is based at least in part on a relationship between respective operational components. The performed operations may further include outputting a representation of the power generation class model based at least in part on the association.

According to a further embodiment, there is disclosed a system including at least one memory that stores computer-executable instructions, and at least one processor configured to access the at least one memory. The at least one processor is configured to execute the computer-executable instructions to generate one or more objects in a power generation class model, wherein the one or more objects are associated with one or more respective operational components in a power generation system. The at least one processor may also be configured to associate at least one object with at least one other object of the one or more objects, wherein the association is based at least in part on a relationship between respective operational components. The at least one processor may be further configured to output a representation of the power generation class model based at least in part on the association.

Other embodiments, systems, methods, apparatuses, aspects, and features of the invention will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items.

Figure 1:
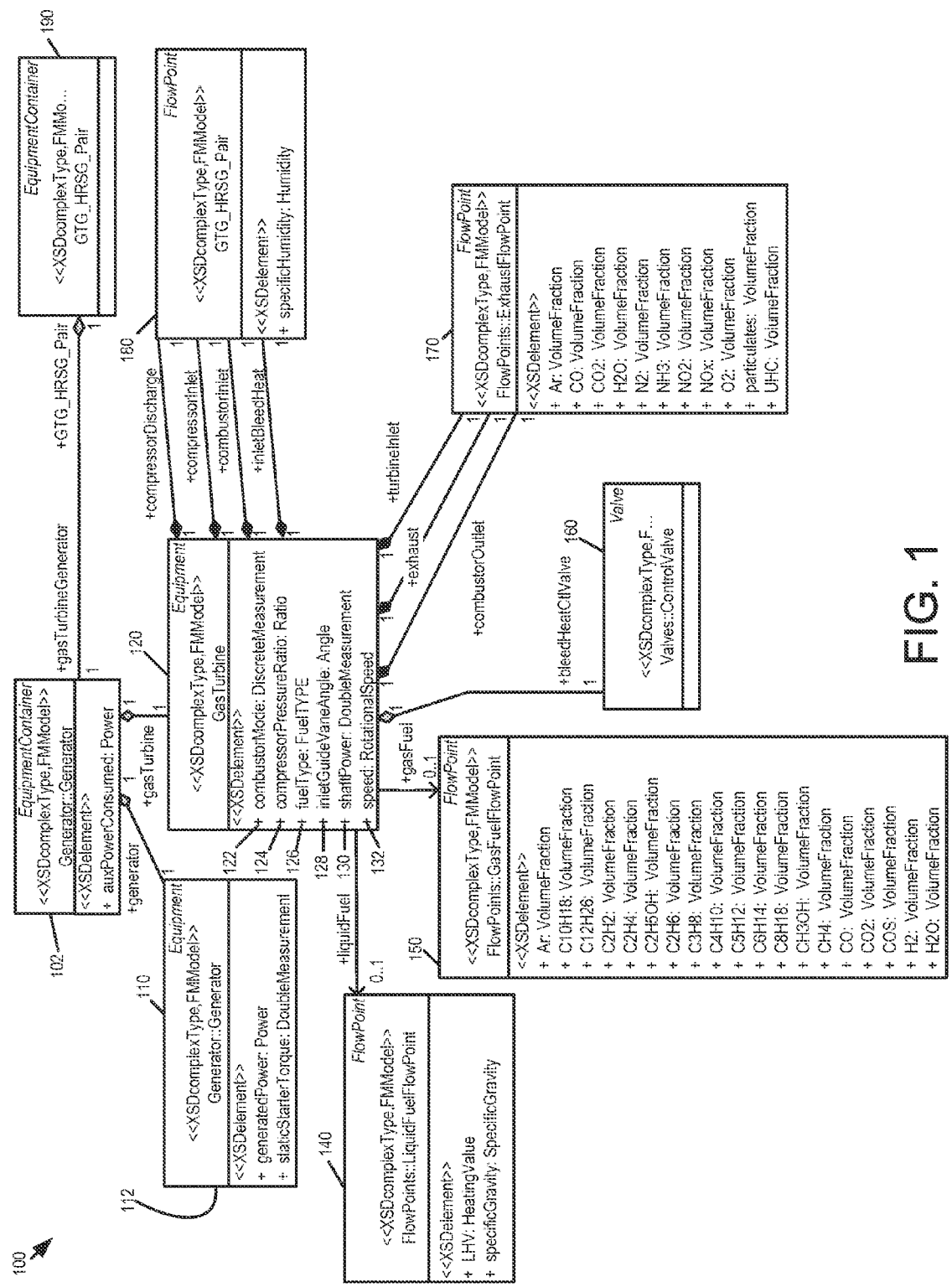
FIG. 1 is an example schematic diagram of a Uniform Modeling Language (UML) diagram including objects and elements associated with a gas turbine generator, according to an example embodiment.

Certain implementations will now be described more fully below with reference to the accompanying drawings, in which various implementations and/or aspects are shown. Various aspects may, however, be implemented in many different forms and should not be construed as limited to the implementations set forth herein. Like numbers refer to like elements throughout.

DETAILED DESCRIPTION OF THE INVENTION

Illustrative embodiments will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements.

Illustrated embodiments herein are directed to, among other things, generating a class model for use by program code to interact with power generation equipment. Such a class model may be referred to herein as a power generation class model because of its relationship to power generation equipment. As used herein, power generation equipment may refer to components, e.g., operational components, that may be used to generate power. Such operational components may be related to other components, e.g., in terms of their operability or reliance on other components to provide power generation or related functions. Each operational component may include attributes that may provide certain information about their operability or functionality. Such attributes, operational components, and the relationships between operational components may be illustrated in a class model, such as that provided by Uniform Modeling Language (UML), in one embodiment. A class model may include one or more objects that may correspond to operational components in a power generation system. Such operational components may include a turbine, a compressor, or a heat recovery steam generator, as non-limiting examples.

A class model may also include one or more elements that may correspond to attributes associated with operational components. Such attributes may provide information about the operability or functionality of operational component with which they are associated. Example attributes for a gas turbine may include, but are not limited to, rotational speed, fuel type, and shaft power. A class model may further include one or more lines or edges that may connect objects in the class model. Such a connection may indicate a relationship, e.g., an operational relationship or dependency, between operational components connected by an edge. Unique identifiers may be used in the class model to uniquely identify objects and elements such that each corresponding operational component or attribute, respectively, may have its own identification or description amongst other operational components and attributes. These identifications, at least in part, may facilitate the preservation of semantic meanings for operational components and attributes in power generation systems.

In one embodiment, a class model may be compiled into computer-executable instructions that may be used by object-oriented program code to interact with operational components at various power generation stations without requiring software developers to develop location-specific program code. In one embodiment, the identifiers and relationships used to create the class model may be established by power plant experts and software developers who may work together to generate consistent semantics that may be used to identify operational components and attributes independent of a power plant location. Such efforts in part may enable the elimination of duplicate program code for interacting with operational components and their attributes.

The technical effects of certain embodiments herein may include the ability to reuse software applications across a number of power plant locations. Additionally, software developers and power plant experts may have enhanced discussions because both groups of persons may more readily discuss operational components, due to the existence of consistent semantics for the operational components. Such software application reuse and enhanced discussions regarding operational components in a power generation system may result in more efficient and less costly processes associated with interacting with operational components via software applications.

FIG. 1 is an example schematic diagram of a class model including objects and elements associated with a gas turbine generator, according to an example embodiment. As indicated above, operational components in a power generation system may be associated with attributes and one or more other operational components. As shown in FIG. 1, a gas turbine object 120 representing a gas turbine may include elements such as combustor mode 122, compressor pressure ratio 124, fuel type 126, inlet guide vane angle 128, shaft power 130, and speed 132, each of which may represent attributes associated with a gas turbine.

The gas turbine object 120 (and its elements) may be associated with a generator object 110 representing a generator. In one embodiment, associations between operational components may be used to track operations between associated components. For example, the association between the gas turbine object 120 and the generator object 110 may be leveraged to identify data correlations such as that between the generator's generated power 112 attribute and the gas turbine's rotational speed attribute 132. The gas turbine object 120 may also be associated with other operational components, such as its fuel sources. As shown in FIG. 1, these sources may include a liquid fuel flow point 140 and gas fuel flow point 150. Other operational components associated with the gas turbine object 120 may include, but are not limited to, a control valve 160, an exhaust flow point 170, and an air flow point 180. Various other embodiments may include different operational components, attributes, relationships between operational components, and/or data correlations between attributes of operational components.

Figure 2:
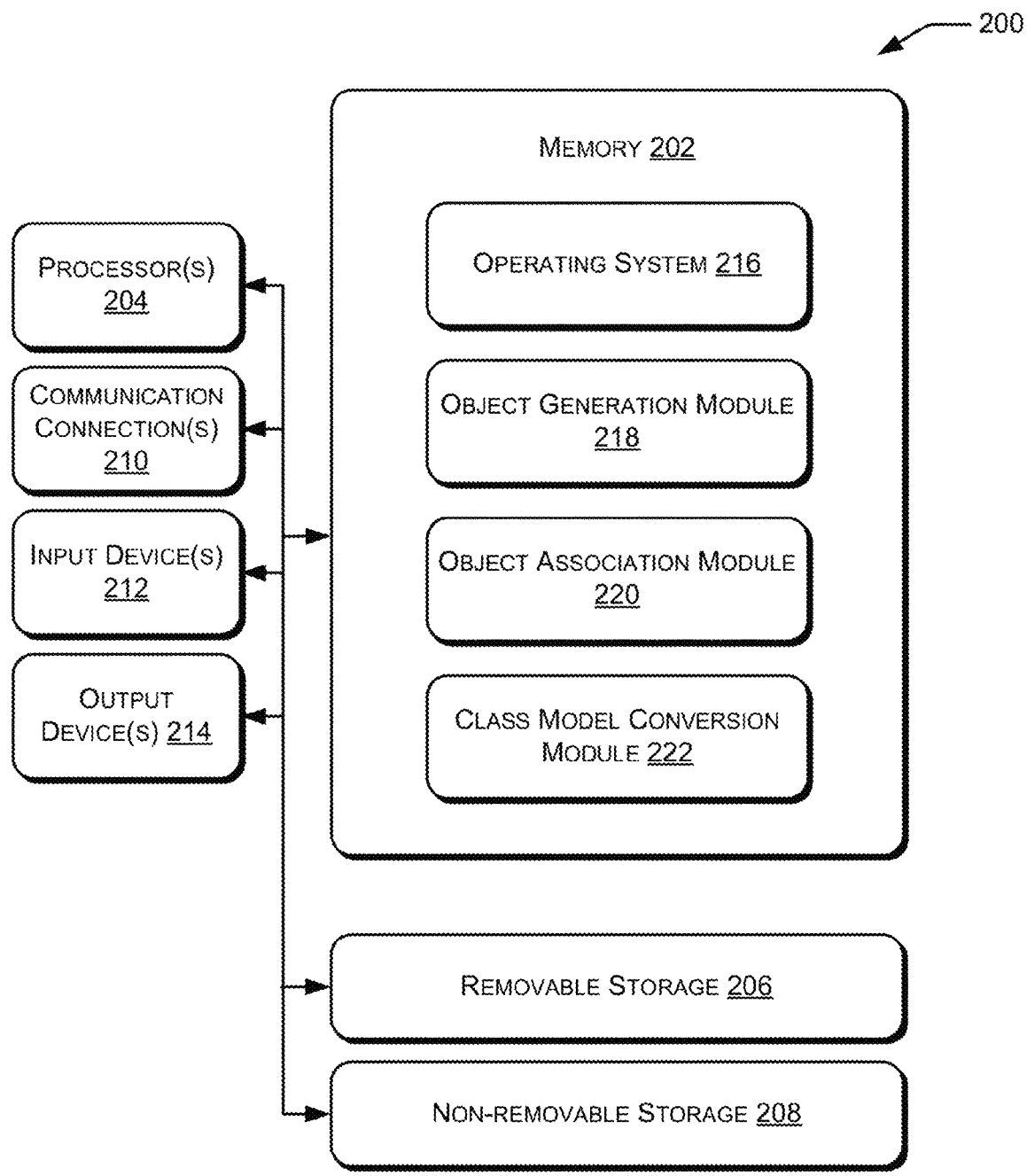
FIG. 2 is a block diagram of an example computing environment for generating a class model for use by program code to interact with power generation equipment, according to an example embodiment.

FIG. 2 depicts a block diagram of an exemplary computing environment for generating a class model for use by program code to interact with operational components, according to one embodiment. The computing environment 200 can include a computing device which can include a processor 204 capable of communicating with a memory 202. The processor 204 may be implemented as appropriate in hardware, software, firmware, or combinations thereof. Software or firmware implementations of the processor 204 may include computer-executable or machine-executable instructions written in any suitable programming language to perform the various functions described. Examples of computing devices may include a personal computer, mainframe, web server, mobile device, or any processor-based device capable of executing instructions to perform the functions described in embodiments herein.

A memory 202 may store program instructions that are loadable and executable on the processor 204, as well as data generated during the execution of these programs. Depending on the configuration and type of computing environment 200, a memory 202 may be volatile (such as random access memory (RAM)) and/or non-volatile (such as read-only memory (ROM), flash memory, etc.). The computer device may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

The memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the computer device. Combinations of any of the above should also be included within the scope of computer-readable media.

In other embodiments, however, computer-readable communication media may include computer-readable instructions, program modules, or other data transmitted within a data signal, such as a carrier wave, or other transmission. As used herein, however, computer-readable storage media does not include computer-readable communication media.

The computing environment 200 may also contain one or more communication connections 210 that allow the computer device to communicate with assets capable of communicating with a computing device. For example, the computing device may communicate with sensors that monitor various units in an asset. The connections 210 may be established via a wired and/or wireless connection between a computer device and an asset. The connection may involve a network such as the Internet or may be a direct connection (i.e., excluding a network) between the computer device and the equipment, according to various embodiments. The computing environment 200 may also include one or more input devices 212, such as a keyboard, mouse, pen, voice input device, and touch input device. It may also include one or more output devices 214, such as a display, printer, and speakers.

Turning to the contents of the memory 202 in more detail, the memory 202 may include an operating system 216 and one or more application programs or services for implementing the features and aspects described herein, including an object generation module 218, an object association module 220, and a class model conversion module 222.

The object generation module 218 may generate one or more objects in a class model. As noted, objects in a class model may be associated with operational components in power generation equipment, such as, but not limited to, a turbine, a compressor, or a heat recovery steam generator. The object generation module 218 may be implemented by UML to create a UML diagram, or UML code representing the objects and elements in the UML diagram, according to various embodiments. The object generation module 218 may provide a graphical user interface (GUI) that may enable a user to select objects (or graphical containers representing the objects), position the objects within a canvass area or space in the GUI, e.g., via a drag and drop operation, and assign identifiers or descriptions to the objects (and their elements). In one embodiment, a class model may be embodied as shown in FIG. 1, in which objects 102, 110, 120, 140, 150, 160, 170, 180, and 190 may be generated. The identifiers or descriptions may be determined by various users (e.g., software developers and power plant experts) to ensure that they are used consistently by various software applications, in one embodiment.

The object generation module 218 may further allow a user to select or specify elements (i.e., object elements) that may correspond to attributes for an operational component, which may provide information about the operability or functionality of the operational component. A unique identifier or description may also be assigned to object elements in similar fashion to that performed for objects. The object generation module 218 may enable a user to position selected or specified elements in a visual portion of their associated objects, in one embodiment. As noted, example elements (attributes) associated with the gas turbine module 120 (gas turbine) may include combustor mode 122, compressor pressure ratio 124, fuel type 126, inlet guide vane angle 128, shaft power 130, and speed 132.

An object association module 220 may enable a user to associate objects with one another to signify a relationship between operational components represented by the objects. In one embodiment, lines or edges in a class model may connect objects, as shown in the example embodiment of FIG. 1. Any number of associations between objects may be established by the object association module 220 to establish relationships between various operational components in a power generation system, in some embodiments. The object model association module 220 may also associate object elements with objects by positioning the elements in containers as performed by the object generation module 218 described above.

In the manner described above, the object generation module 218 and the object association module 220 may generate associations between operational components (e.g., turbines or compressors) and their attributes (e.g., speed and shaft power) in power generation systems. Each operational component and/or attribute may have a unique identifier or description such that the semantic meaning of the operational components may be maintained across power generation plants. Numerous operational components and attributes other than those shown in FIG. 1 may exist in other embodiments.

The class model conversion module 222 may output a class model, e.g., a power generation class model. Such outputting may include converting the class model into a format representative of the class model. The outputted class model may be based at least in part on the associations between objects in the class model, in one embodiment. In one example, the class model may be converted into machine-execution code that may be used by program code to interact with operational components associated with objects in the class model, as well as attributes associated with elements in the class model. In one embodiment, a class model, such as a UML model, may be converted into a compilable format, such as an Extensible Markup Language Schema Definition (XSD Schema). The XSD Schema representing the class model may be compiled by various compilers, such as Java Architecture for Extensible Markup Language Binding (JAXB), to create a Java class for use by Java program code. Objects may also be created in C# for use by C# program code. Various other types of objects and program code may be created in other examples.

In one embodiment, a class model may contain data relationships between power generation components, whereas behavior or functions residing in service interfaces that may use the data relationships to interact with power generation components. In this way, behavior may be defined external to a class model, thereby keeping the class model more generic and reusable, e.g., across various power generation plants. Service interfaces may be converted to a Web Services Description Language (WSDL) and, along with an XSD Schema of a power generation class model, may be packaged as a Java archive (jar) file or other library file for use by various software applications.

Software applications or program code may use a class model, e.g., a power generation class model, in one or more of the formats described above, to interact with components in a power generation system. In one example, by referencing in program code a jar file that includes the power generation components and attributes of FIG. 1, a software developer may develop a software application to interact with a gas turbine corresponding to the gas turbine object 120. Such interaction may include accessing information from with the gas turbine or related components and/or providing information to the gas turbine or related components. For example, a software developer may retrieve the rotational speed of a gas turbine by referencing the rotational speed attribute 132 in the gas turbine object 120. Certain embodiments herein relate to allowing the same or similar retrieval of rotational speeds of other gas turbines at different power generation plants by specifying in program code the same reference to rotational speed, hence generic reusable program code based on common semantics associated with operational components in power generation systems. Various other examples of program code retrieving other information or updating information in operational components by interfacing with objects and elements in the power generation class model may exist in other embodiments.

Figure 3:
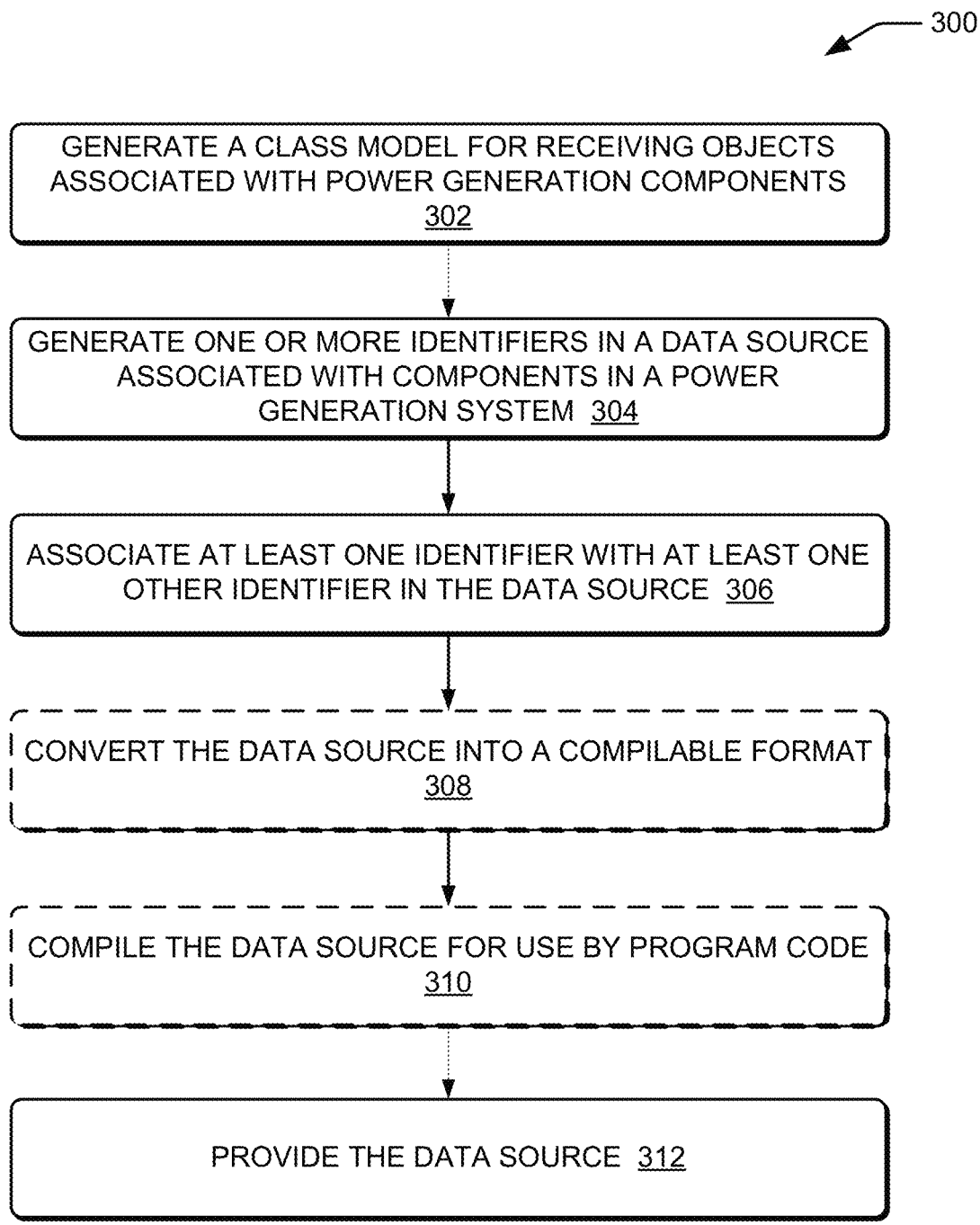
FIG. 3 is an example flow diagram illustrating details for generating a class model for use by program code to interact with power generation equipment, according to an example embodiment.

FIG. 3 is an example flow diagram 300 illustrating details for generating a class model for use by program code to interact with operational components, according to an example embodiment. In one example, a computing device can perform any, some, or all of the operations of process 300. The process 300 is illustrated as a logical flow diagram, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions can include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302, where a class module for receiving objects associated with power generation components, e.g., operational components, may be generated, e.g., via the object generation model 218. In one embodiment, class model 100 may be generated. The class model may include objects and elements associated with power generation equipment and may be referenced by program code, in various formats, to interact with power generation components. In one embodiment, the class model may be generated using UML as described above.

At block 304, the objects associated with power generation components may be generated, e.g., via the object generation model 218. The objects may be placed in a canvass area by a user and uniquely indentified among various other power generation components that may also be generated in the class model. Elements, which may correspond to attributes associated with power generation components, may be related to the objects in the class model, at block 306. Such attributes may provide certain information about the operability or functionality of power generation components with which they are associated. For example, fuel type, shaft power, and speed may be attributes associated with a gas turbine and may be so indicated, as shown in FIG. 1.

At block 308, at least one object may be associated with at least one other object in the class model, e.g., via the object association module 220. Such an association may be indicated in the class model by connecting a line or edge between associated components. The association may indicate to program code that elements in one object are accessible to another object, e.g., a related object. For example, as shown in FIG. 1, a software developer who may have created an instance of the gas turbine object, may also have access to elements in the liquid fuel flow points 140 object and elements in the gas fuel flow points object 150, by virtue of instantiating the gas turbine object. This may be accomplished due to the association made in the class model between the gas turbine object 120, the liquid fuel flow points object 140, and the gas fuel flow points object 150.

A class model, such as a power generation class model, may be converted into a compilable format, e.g., via the class model conversion module 222, in one embodiment. For example, the class model may be converted to an XSD Schema (at block 310) and compiled (at block 312) to create an class, such as a Java class or C# class, that may be used by Java program code or C# program code, respectively, to interact with power generation components. At block 314, the class model may be output, e.g., as a jar file or other library file so that it may be shared by various program code. Various other compilable formats, interpreter-based formats, other formats, and/or other program coding languages may be used in other embodiments.

Illustrative systems and methods for generating a class model for use by program code to interact with operational components in a power system are described above. Some or all of these systems and methods may, but need not, be implemented at least partially by configurations such as those described in FIGS. 1 and 2. It should be understood that certain acts in the methods may be rearranged, modified, and/or omitted entirely, depending on the circumstances. Also, any of the acts described above with respect to any method may be implemented by any number of processors or other computing devices based on instructions stored on one or more computer-readable storage media.

What is claimed is:

1. A method comprising:
generating, by a computing system comprising one or more computers, one or more objects in a power generation class model, wherein the one or more objects are associated with respective operational components in a power generation system, wherein the respective operational components comprise of a turbine, a compressor, and a heat recovery steam generator;
associating, by the computing system, at least one object with at least one other object of the one or more objects, wherein the association is based at least in part on a relationship between respective operational components, and wherein the relationship is at least one of an operational relationship between respective operational components or a dependency between respective operational components;
accessing, by one or more processors for the computing device, at least one element of the one or more objects to interact with a respective attribute of an operational component of the respective operational components, wherein the elements of the one or more objects comprise compressor pressure ratio, fuel type, inlet guide vane angle, shaft power, and speed; and
outputting, by the computing system, a representation of the power generation class model based at least in part on the association.

2. The method of claim 1, wherein the representation comprises machine-executable instructions, wherein the machine-executable instructions are generated by compiling the power generation class model.

3. The method of claim 2, wherein the representation comprises a compilable format.

4. The method of claim 3, wherein the compilable format is Extensible Markup Language Schema Definition (XSD).

5. The method of claim 1, wherein the power generation class model is generated using Unified Modeling Language (UML).

6. One or more non-transitory computer-readable media storing computer-executable instructions that, when executed by at least one processor, configure the at least one processor to perform operations comprising:

generating one or more objects in a power generation class model, wherein the one or more objects are associated with respective operational components in a power generation system, wherein the respective operational components comprise of a turbine, a compressor, and a heat recovery steam generator;

associating at least one object with at least one other object of the one or more objects, wherein the association is based at least in part on a relationship between respective operational components, and wherein the relationship is at least one of an operational relationship between respective operational components or a dependency between respective operational components;

accessing, by one or more processors for the computing device, at least one element of the one or more objects to interact with a respective attribute of an operational component of the respective operational components, wherein the elements of the one or more objects comprise compressor pressure ratio, fuel type, inlet guide vane angle, shaft power, and speed; and outputting a representation of the power generation class model based at least in part on the association.

7. The one or more non-transitory computer-readable media of claim 6, wherein the representation comprises machine-executable instructions, wherein the machine-executable instructions are generated by compiling the power generation class model.

8. The one or more non-transitory computer-readable media of claim 7, wherein the representation comprises a compilable format.

9. The one or more non-transitory computer-readable media of claim 8, wherein the compilable format is Extensible Markup Language Schema Definition (XSD).

10. The one or more non-transitory computer-readable media of claim 1, wherein the power generation class model is generated using Unified Modeling Language (UML).

11. A system comprising:
at least one memory that stores computer-executable instructions; and
at least one processor configured to access the at least one memory, wherein the at least one processor is configured to execute the computer-executable instructions to:

generate one or more objects in a power generation class model, wherein the one or more objects are associated with respective operational components in a power generation system, wherein the respective operational components comprise of a turbine, a compressor, and a heat recovery steam generator;

associate at least one object with at least one other object of the one or more objects, wherein the association is based at least in part on a relationship between respective operational components, and wherein the relationship is at least one of an operational relationship between respective operational components or a dependency between respective operational components;

access at least one element of the one or more objects to interact with a respective attribute of an operational component of the respective operational components, wherein the elements of the one or more objects comprise compressor pressure ratio, fuel type, inlet guide vane angle, shaft power, and speed; and output a representation of the power generation class model based at least in part on the association.

12. The system of claim 11, wherein the representation comprises machine-executable instructions, wherein the machine-executable instructions are generated by compiling the power generation class model.

13. The system of claim 12, wherein the representation comprises a compilable format.

14. The system of claim 13, wherein the compilable format is Extensible Markup Language Schema Definition (XSD).

15. The system of claim 11, wherein the power generation class model is generated using Unified Modeling Language (UML).

* * * * *